United States Patent [19]

Imanari et al.

[11] Patent Number: 5,198,935
[45] Date of Patent: Mar. 30, 1993

[54] LENS BARREL WITH ULTRASONIC WAVE MOTOR

[75] Inventors: Hitoshi Imanari, Kawasaki; Kunihiro Fukino, Fujisawa; Hiroshi Tanioka, Kashiwa, all of Japan

[73] Assignee: Nikon Corporation, Tokyo, Japan

[21] Appl. No.: 498,904

[22] Filed: Mar. 26, 1990

[30] Foreign Application Priority Data

Mar. 27, 1989 [JP] Japan .................................. 1-71916
Dec. 22, 1989 [JP] Japan ................................. 1-331247

[51] Int. Cl.$^5$ ...................... G02B 15/14; G03B 13/18; H01L 41/04
[52] U.S. Cl. .................................... 359/698; 359/704; 354/400; 310/317; 310/323
[58] Field of Search ............... 350/245, 247, 252, 255, 350/257, 429, 430; 354/195.1–195.12, 400, 402, 286; 310/317–328; 359/696–706, 819–830

[56] References Cited

U.S. PATENT DOCUMENTS

| | | | |
|---|---|---|---|
| 4,553,817 | 11/1985 | Ando et al. ........................ | 354/400 |
| 4,560,263 | 12/1985 | Katsuma et al. .................. | 354/400 |
| 4,660,933 | 4/1987 | Notagashira et al. ............. | 350/255 |
| 4,793,689 | 12/1988 | Aoyagi et al. .................... | 340/317 |
| 4,890,132 | 12/1989 | Hama ................................ | 350/255 |
| 4,893,145 | 1/1990 | Matsuda .......................... | 350/255 |
| 4,963,000 | 10/1990 | Kawai ............................... | 350/255 |
| 5,052,781 | 10/1991 | Iizuka ............................... | 359/823 |

FOREIGN PATENT DOCUMENTS 59-101608 6/1984 Japan .
111609 6/1984 Japan .
61-65214 4/1986 Japan .
61-86718 5/1986 Japan .
178909 7/1989 Japan .

OTHER PUBLICATIONS

Journal of Society for Electronic Information Communication, vol. 70, No. 7, pp. 717–720, Jul. 1987 (with partial translation).

Primary Examiner—Bruce Y. Arnold
Assistant Examiner—Thong Nguyen
Attorney, Agent, or Firm—Shapiro and Shapiro

[57] ABSTRACT

A lens barrel comprises a lens moving member rotatable about the optical axis of the lens barrel for axially moving a focusing lens group, a manual operation member for manually rotating the lens moving member, an ultrasonic wave motor including of a stator composed of piezoelectric members and an elastic member, and a rotor rotating about the optical axis and maintained in pressure contact with the stator, a mode switching member for selecting either a first focusing mode for effecting focusing by driving the lens moving member by the ultrasonic wave motor, or a second focusing mode for effecting focusing by rotating the lens moving member with the manual operation member, and a clutch member engaged for transmitting the rotation of the rotor to the lens moving member without change in the contact pressure of the rotor with the stator in response to the switching to the first focusing mode by the mode switching member, and disengaged in response to the switching to the second focusing mode.

6 Claims, 5 Drawing Sheets

LENS BARREL WITH ULTRASONIC WAVE MOTOR

BACKGROUND OF THE INVENTION

1. Field of the Invention

The present invention relates to a lens barrel capable of focusing by an ultrasonic wave motor incorporated therein, and more particularly to a lens barrel capable of automatic focusing or powered focusing by the driving force of an ultrasonic wave motor and also of manual focusing by a manual operation ring.

2. Related Background Art

There are already known different mechanisms for effecting automatic focusing and powered focusing with an ultrasonic wave motor, and methods for switching between an automatic mode by an ultrasonic wave motor and a manual mode by a manual operation are disclosed for example in the Japanese Laid-open Patents No. 59-101608 and No. 61-86718. Also the control of the ultrasonic wave motor is disclosed in the Japanese Laid-open Patent No. 61-65214. Furthermore, a condition in which the ultrasonic wave motor is stopped by the destruction of a resonance state when the pressure between the stator and the rotor exceeds a nominal value is reported in the Journal of Society for Electronic Information Communication, Vol. 70, No. 7, pp 717-720, July 1987.

In the above-mentioned prior art, there is a structure in which the rotor of the ultrasonic wave motor is directly connected with or disconnected from a driving member for a focusing lens group by means of a mechanical clutch member. However, the experiments of the present inventors have revealed that the clutch member requires a considerable axial pressure to the rotor, in order to securely couple the clutch member to the rotor, particularly in a rotating state. Consequently there is a drawback in that the pressure between the rotor and the stator exceeds the above-mentioned nominal value, thus destroying the resonance state and eventually stopping the motor.

SUMMARY OF THE INVENTION

An object of the present invention is to provide a lens barrel equipped with a clutch mechanism which is capable, in a focusing operation in the automatic focusing mode or in the powered focusing mode, of securely transmitting the rotation of the ultrasonic wave motor to a lens moving device for focusing without interruption of rotation of the ultrasonic wave motor, and, in a manual focusing mode, of securely disconnecting the lens moving device from the ultrasonic wave motor by an extremely simple operation.

The above-mentioned object can be attained, according to the present invention, by a lens barrel provided with lens moving means rotatable about the optical axis of the lens barrel for axially moving a focusing lens group; manual operation means for manually rotating said lens moving means; an ultrasonic wave motor including a stator composed of piezoelectric members and an elastic member, and a rotor rotating about the optical axis and maintained in pressure contact with said stator; mode switching means for selecting either a first focusing mode for effecting operation focusing operation by driving said lens moving means by said ultrasonic wave motor, or a second focusing mode for effecting operation focusing operation by rotating said lens moving means with said manual operation means; and clutch means engaged for transmitting the rotation of the rotor to said lens moving means without change in the contact pressure of said rotor with the stator in response to the switching to said first focusing mode by said mode switching means, and disengaged said in response to the switching to said second focusing mode.

In the lens barrel of the present invention, because of the above-mentioned structure, the pressure of the clutch means is not applied to the rotor at the switching from the second focusing mode to the first focusing mode, so that the contact pressure between the stator and the rotor is not changed. Consequently, the undesired stopping of the ultrasonic wave motor can be prevented.

Other objects of the present invention, and the advantages and features thereof, will become fully apparent from the following detailed description which is to be taken in conjunction with the attached drawings.

DESCRIPTION OF THE PREFERRED EMBODIMENTS

Now the present invention will be clarified in detail by embodiments thereof shown in the attached drawings.

Figure 1:
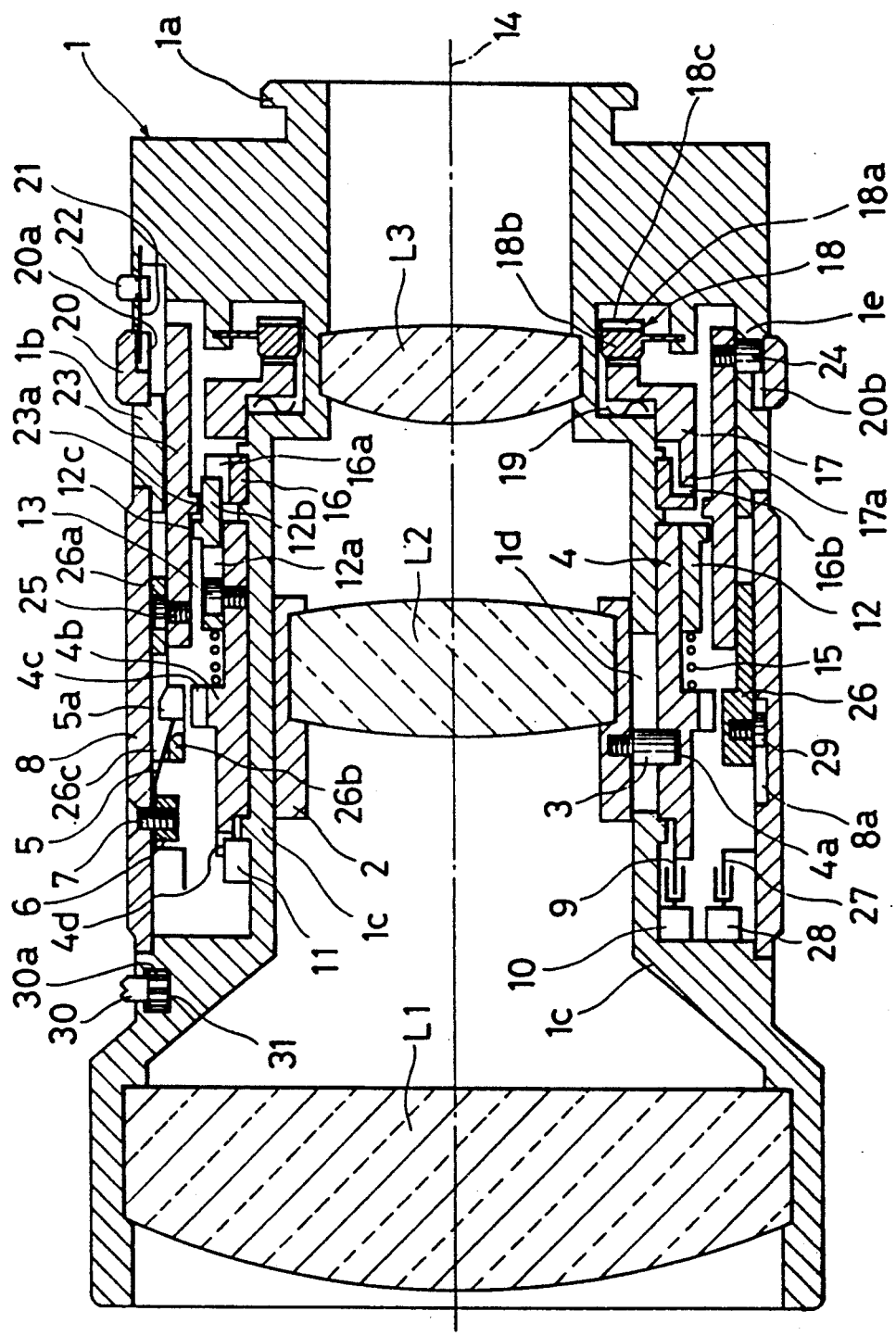
FIG. 1 is a longitudinal cross-sectional view of a first embodiment of the lens barrel of the present invention.
Figure 2:
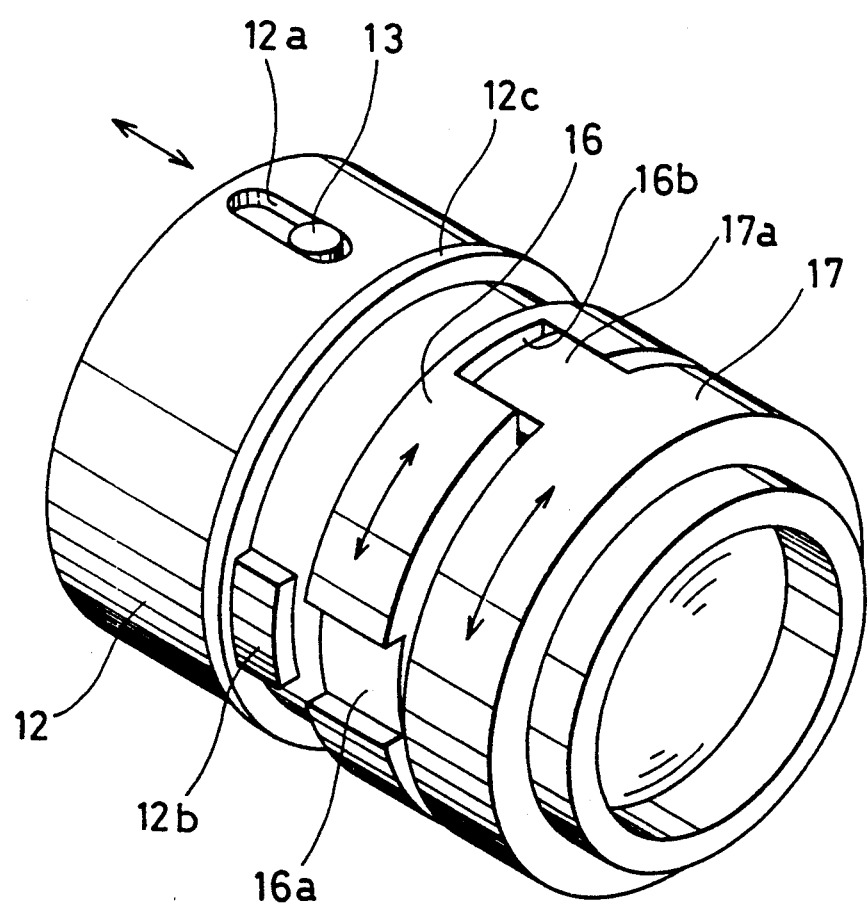
FIG. 2 is a perspective view of a clutch, showing the engaging relationship among a rotating member, a clutch member and a rotor.

FIG. 1 shows a first embodiment of the lens barrel of the present invention, and FIG. 2 shows, in a perspective view, a clutch constituting a principal part of the lens barrel shown in FIG. 1. Referring to FIG. 1, a fixed barrel 1 having bayonet fingers 1a for mounting on a camera body is composed of an outer tube 1b and an inner tube 1c. In the inner tube 1c, there are provided fixed lens groups L1, L3, and there is also slidably provided a tube 2 supporting a focusing lens group L2. A pin 3 provided on tube 2 engages with a linear guide groove 1d formed on the inner tube 1c and with a leading groove 4a formed on a rotating tube 4 rotatably fitted around the inner tube 1c.

On the external periphery of rotatable tube 4 there is formed an annular projection 4b with plural key grooves 4c of the same width selected so as to be engageable with a key 5a formed integrally at the front end of a clutch spring 5. The clutch spring 5 is fixed, by means of a nut 6 and a small screw 7, on a manual operation ring 8. The rotatable tube 4 is provided with an encoder pattern 9 at the left side thereof, and with a notch 4d for limiting the rotation thereof. For detecting encoder pattern 9, a detecting device 10 is provided in the inner tube 1c of the fixed lens barrel 1, and sends signals, indicating the rotating direction and rotating angle of the rotatable tube 4, to a CPU (shown in FIG. 3) provided in the lens barrel. The above-mentioned notch 4d is so designed as to engage with a rotation limiting member 11 provided on the inner tube 1c.

On the external periphery at the right-hand end of the rotatable tube 4, there is fitted an annular clutch member 12 provided with a linear guide groove 12a. A pin 13 provided on the rotatable tube 4 engages with the groove 12a, whereby the clutch member 12 can slide in the direction of the optical axis 14. Between the annular projection 4b at the center of the rotatable tube 4 and the left end face of the clutch member 12, there is provided a compression coil spring 15 for biasing the clutch member 12 toward right in the drawing, until it is limited by pin 13 and the left end of groove 12a. On the right end face of the clutch member 12 there are provided plural projections 12b of the same width, at a regular pitch.

On the external periphery of the inner tube 1c at the right-hand side of the rotatable tube 4, there is provided a coupling ring 16 rotatable about the optical axis but not displaceable in the axial direction. On the external periphery of coupling ring 16, there are provided engaging grooves 16a of a number the same as that of projections 12b or a multiple of that of the number of projections 12b, with a regular pitch, and the width of grooves 16a is selected so that the grooves are engageable with the projections 12b as shown in FIG. 2. The coupling ring 16 is further provided with grooves 16b for one-to-one engagement with plural projections 17a formed on the rotor 17 of the ultrasonic wave motor, as shown in FIG. 2. In the embodiment shown in FIG. 1, grooves 16b do not reach the left end of the coupling ring 16, in order to prevent the disengagement of the projections 12b, and are so positioned as not to interfere with the engaging grooves 16a in the circumferential direction. The engaging relationship among the grooves 16a, 16b of the coupling ring 16, projections 12b of the clutch member 12 and the projections 17a of the rotor 17 is shown in FIG. 2.

The ultrasonic wave motor is provided with a rotor 17 and a stator 18. The rotor 17 is constantly maintained in pressure contact with the stator 18, by the biasing force of a pressurizing member 19, such as a plate spring, provided between rotor 17 and the inner tube 1c of the fixed lens barrel 1. The stator 18 is provided with piezoelectric elements 18a and an elastic member 18b, which is supported by the fixed lens barrel 1. The rotor 17 is rotatably fitted around the external periphery of the inner tube 1c of the fixed lens barrel 1. On a planar portion 18c behind the stator 18 there are provided terminals (not shown) for power supply or signal transmission, connected to a motor driving circuit for supplying AC voltages for driving the ultrasonic wave motor.

On the outer tube 1b fixed lens barrel, there is rotatably provided a mode selection ring 20, which is provided with marks for three focusing modes, namely manual ("M") mode, powered focusing ("PF") mode and automatic focusing ("AF") mode. The mode selection ring 20 can be locked by the engagement of a plate spring 21, fixed at an end thereof to the fixed lens barrel 1, and one of three grooves 20a formed on ring 20 and engageable with plate spring 21 (PF mode position or AF mode position being shown in FIG. 1). The locking can be released by pushing a selection button 22 for disengaging the plate spring 21 from the groove 20a. Also between a mode selection ring 20 and the fixed lens barrel 1, there is provided electric signal generating means (not shown) for generating a mode selection signal. Inside the outer tube 1b of the fixed lens barrel 1, there is fitted an intermediate tube 23 for mode selection. A pin 24 provided at the right end portion of intermediate tube 23 engages with a linear groove 20b formed on the internal periphery of the mode selection ring 20 and with a cam groove 1e formed on the fixed lens barrel 1. The intermediate tube 23 is provided therein with a projection 23a, engaging with an annular projection 12c on the external periphery of the clutch member 12. There is formed a certain gap between projection 23a and annular projection 12c in the state of PF or AF mode as shown in FIG. 1. Also on the external periphery at the left end of the intermediate tube 23, there is provided a pin 25 engaging with a circumferential groove 26a formed on an intermediate ring 26 fitted inside the manual operation ring 8.

On the external periphery of the fixed lens barrel 1, there is rotatably fitted the manual operation ring 8, which is provided, for detecting the rotation thereof, with an encoder pattern 27, and a detecting device 28 fixed on the fixed lens barrel 1 sends signals indicating the rotating direction and angle of manual operation ring 8 to the CPU provided in the lens barrel. On the internal periphery of the manual operation ring 8 there is provided a linear groove 8a, engaging with a pin 29 provided on the intermediate ring 26 slidably fitted in manual operation ring 8. The intermediate ring 26 is provided, in a part thereof, with a notch 26c for accommodating an end of the clutch spring 5. The clutch spring 5 is maintained in contact with a projection 26b of the intermediate ring 26, and a key 5a formed at an end of said clutch spring 5 is vertically moved by the displacement of the intermediate ring 26 in the direction of optical axis 14.

In a front part on the external periphery of the fixed lens barrel 1, there is provided a switch 30 for memorizing an arbitrary focus position (a position in the photographing range) in the PF or AF mode, switch 30 being integral with a brush 30a which is in contact with a signal generating pattern formed on the periphery of the fixed lens barrel 1. The signal generated by pattern 31 and brush 30a is sent to and memorized in the CPU of the lens barrel.

Figure 3:
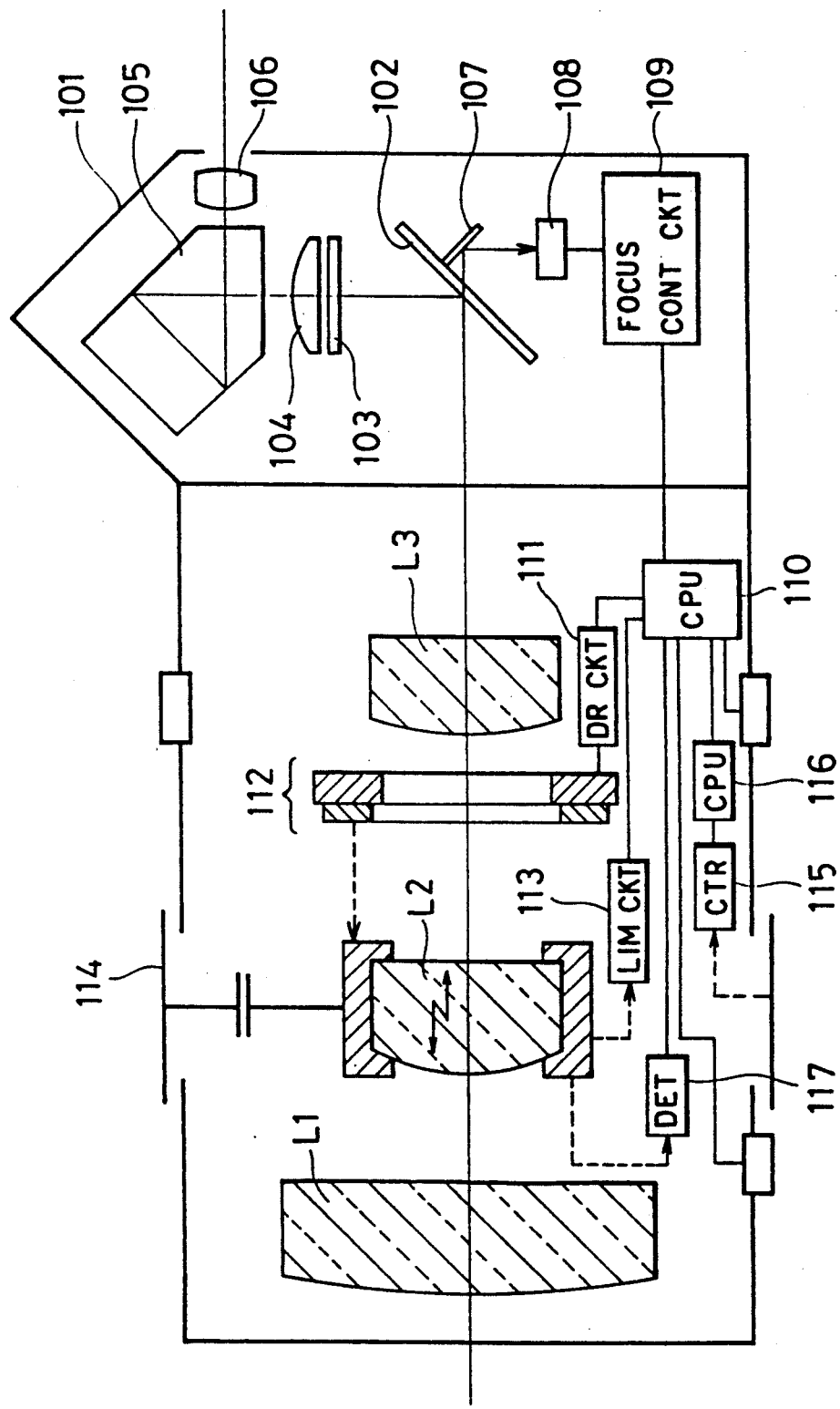
FIG. 3 is a schematic view of a system in which the lens barrel of the present invention is combined with a camera body.

FIG. 3 is a schematic view of a system in which the lens barrel of the present invention is combined with a camera body. In the AF mode, the light from an object is transmitted by lenses L1-L3 then partly reflected by a half mirror 102 of the camera body 101, and forms an image of the object on a focusing screen 103. The image is guided to the eyes of the operator through a condenser lens 104, a pentagonal prism 105 and a finder eyepiece lens 106. A part of the remaining light transmitted by the half mirror 102 is reflected by a sub mirror 107 and enters a photoelectric converter unit 108, thus generating a signal corresponding to the focus state.

The output signal from the photoelectric converter unit 108 is supplied to a known focus control circuit 109, which determines the direction and amount of driving of the focusing lens group L2. The drive signal supplied from the focus control circuit 109 is transmitted to the CPU 110 in the lens, and drives, through a motor drive circuit 111, an ultrasonic wave motor 112 (corresponding to 17, 18 in FIG. 1) until the above-mentioned drive amount of the focusing lens group L2 is reached. At the end of the driving operation, the photoelectric converter unit 108 again detects the focus state, and, if the focused state is not yet reached, the above-explained operations are repeated until the focused state is obtained. Between the rotation limiting member 11 of the lens barrel and the rotatable tube 4, there is provided a limit circuit 113 for causing the lens barrel CPU 110 to invert the movement of the focusing lens group L2 when it reaches an end position corresponding to the infinite object distance or to the shortest object distance.

In the PF mode, a pulse count circuit 115 detects the direction and amount of rotation and the speed of a manual operation ring 114 (corresponding to 8 in FIG. 1), and sends a detection signal to a CPU 116 for powered focusing pulse processing, which in turn sends a signal to the lens barrel CPU 110. Thus a signal therefrom drives the motor through the motor drive circuit 111. In this operation, the movement of the focusing lens group L2 is monitored by a lens drive detecting circuit 117 (corresponding to the encoders 9, 10 in FIG. 1) and fed back to the lens barrel CPU 110. Thus the motor driving is stopped when the amount of movement monitored by detection circuit 117 reaches an amount instructed by the lens barrel CPU 110 in relation to the amount of movement of the manual operation ring 114.

In the following there will be explained the function of the first embodiment. The PF or AF mode, in which the focusing lens group L2 is moved by the driving force of the incorporated ultrasonic wave motor (17, 18, 112), can be selected by rotating the mode selection ring 20 while pushing the selection button 22 to a position PF or AF where the plate spring 21 engages with a groove 20a. The rotation of the rotor 17 is initiated in response to the setting of the PF or AF mode, and FIG. 1 shows a state in which the PF or AF mode is selected.

When the mode selection ring 20 is shifted from the M mode to the PF or AF mode, the intermediate tube 23 integrally rotates with the mode selection ring 20 and at the same time moves toward the right in FIG. 1, following the form of the cam groove 1e, because the pin 24 engages with the linear groove 20b and the cam groove 1e of the fixed lens barrel 1. Also the intermediate ring 26 moves to the right together with the intermediate tube 23, but without rotation, because the circumferential groove 26a of ring 26 engages with the pin 25 of the intermediate tube 23. Also the intermediate ring 26 moves linearly with respect to the operation ring 8, by the linear groove 8a and the pin 29 engaging therewith. In the movement of the intermediate ring 26, the projection 26b thereof pushes up the lower face of the clutch spring 5, whereby the key 5a integral with clutch spring 5, fixed on the operation ring 8 is disengaged from the key groove 4c of the rotatable tube 4, thus disconnecting the operation ring 8 from the rotatable tube 4.

Also the rightward movement of the intermediate tube 23 releases the limitation, on the clutch member 12, by the annular projection 12c thereof engaging with projection 23a, whereby clutch member 12 moves to right by the biasing force of the compression coil spring 15. The clutch member 12 moves linearly to the right with respect to the rotatable tube 4, by means of the linear groove 12a and the pin 13 engaging therewith. Thus the projections 12b of clutch member 12 are pressed to the coupling ring 16 and engage with the grooves 16a of the coupling ring 16, which integrally rotates with the rotor 17 by means of the coupling of the grooves 16b and the projections 17a, whereby the rotation of the ultrasonic wave motor is transmitted to the rotatable tube 4. The rotation of the rotatable tube 4 drives the focusing lens group L2 in the direction of the optical axis 14, owing to the engagement of the lead groove 4a and linear groove 1d with the pin 3, according to the form of lead groove 4a and the cam.

When the mode selection ring 20 is shifted from the PF or AF mode to the M mode, a series of operations inverse to those explained above take place, thereby coupling the operation ring 8 with the rotatable tube 4 by means of the key 5a of the clutch spring 5 and the groove 4c, and disconnecting the coupling ring 16 from the rotatable tube 4 by the clutch member 12. Consequently, in the M mode, the coupling between the ultrasonic wave motor and the focusing lens group L2 is disconnected by the rotatable tube 4, and focusing lens group L2 can be moved by the rotation of the operation ring 8 as the rotatable tube 4 can be rotated by the clutch spring 5. In the present embodiment, the grooves 16b provided on the coupling ring 16 may be formed as completely penetrating grooves similar to the grooves 16a, instead of half-way grooves as illustrated, by reducing the radial position of the projections 12b of the clutch member 12 and the grooves 16a engaging therewith, in such a manner that projections 12b do not fall into the grooves 16b.

Figure 4:
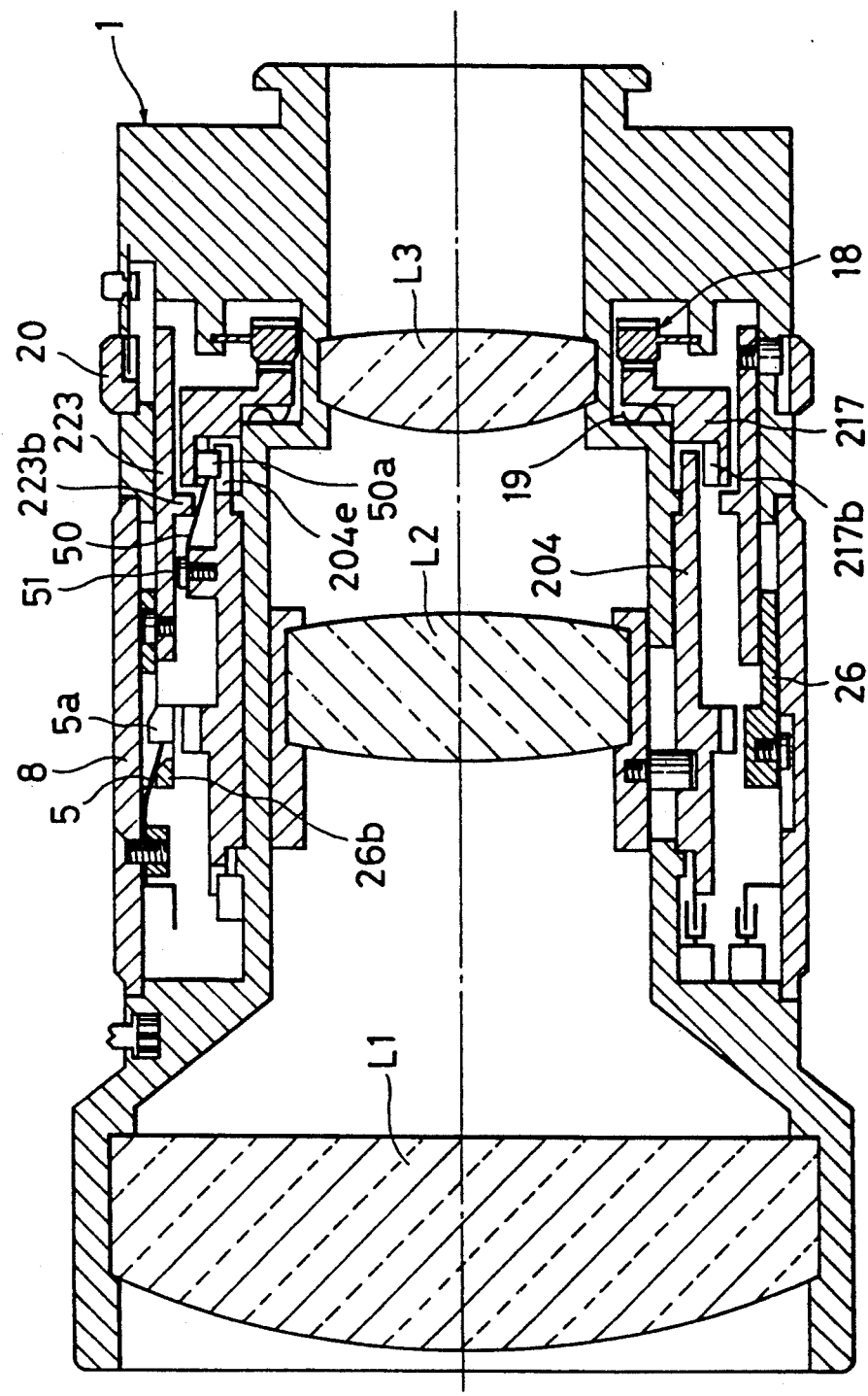
FIG. 4 is a longitudinal cross-sectional view of a second embodiment of the lens barrel of the present invention.

FIG. 4 is a cross-sectional view of a second embodiment of the present invention, employing a different structure in the clutch provided between the rotor of the ultrasonic wave motor and the rotatable tube.

In the second embodiment shown in FIG. 4, a second clutch spring 50 constituting a clutch member, is fixed, by a small screw 51, on a part of a rotatable tube 204. At the rear end of the rotatable tube 204, there is provided a groove 204e in which engages a key 50a formed integrally at the end of the second clutch spring 50. Also plural grooves 217b, capable of engaging with the key 50a, are provided on the internal radial wall of a rotor 217. Inside an intermediate tube 223 there is provided a projection 223b, which, in a state shown in FIG. 4 (AF or PF mode), is not in contact with the second clutch spring 50, but, in the M mode, is in contact and depresses the second clutch spring downwards. Except for the above-explained clutch mechanism for coupling the rotatable tube 204 and the rotor 217, the structure is the same as in the first embodiment. Thus the components having the same functions as those in the first embodiment are represented by the same numbers, and will not be explained further.

In the following there will be explained the coupling operation of the rotatable tube 204 and the rotor 217 by the clutch of the second embodiment shown in FIG. 4. In the AF or PF mode, the intermediate tube 223 moves to the right as in the first embodiment, whereby the key 50a of the second clutch spring 50, depressed by the projection 223b and separated from the grooves 217b of the rotor 217 in the M mode, radially approaches grooves 217b of the rotor 217. In a state where the clutch spring 50 is not in contact with the projection 223b by the rightward movement of the intermediate tube 223 as shown in FIG. 4, the key 50a is pressed against the internal periphery of the rotor 217. In this state, the pressure of the key 50a on the rotor 217 is in the radial direction and does not affect the pressure between the rotor 217 and the stator 18 generated by the pressurizing member 19. Then, upon rotation of the rotor 217, a groove 217b thereof engages with the key 50a, whereby the rotation of the ultrasonic wave motor is transmitted to the rotatable tube 204 through key 50a and groove 204e. The coupling method between the rotor 217 and the rotatable tube 204 is not limited to that explained above. The clutch mechanism may be formed, for example, as a collet chuck for radially grabbing the rotor 217, or may be radially expanded to achieve frictional coupling with the rotor 217.

Figure 5:
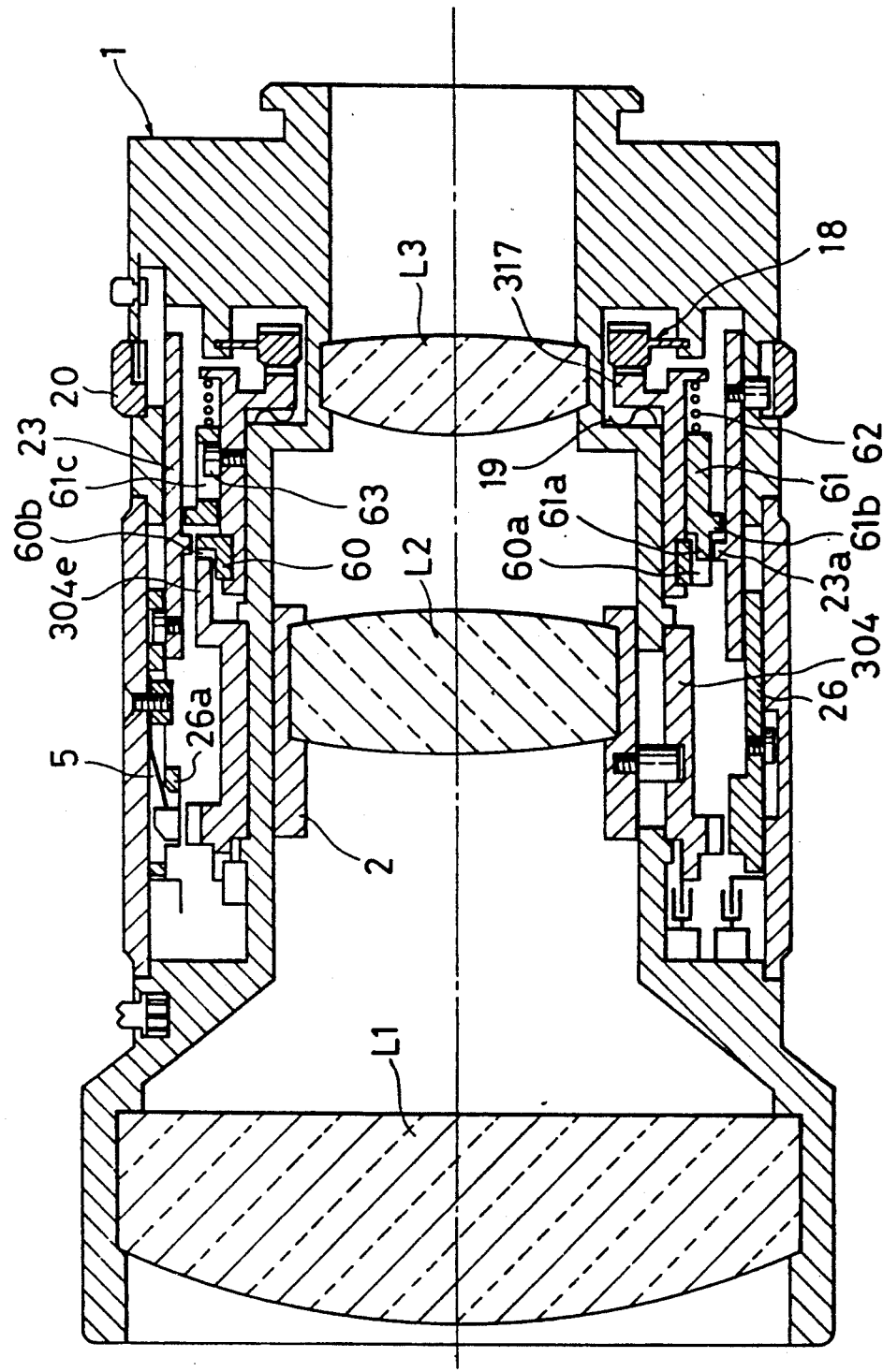
FIG. 5 is a longitudinal cross-sectional view of a third embodiment of the lens barrel of the present invention.

FIG. 5 is a cross-sectional view of a third embodiment of the present invention, in which the switching direction of the mode selecting clutch is inverted in comparison with that in the first embodiment.

In the third embodiment shown in FIG. 5, there is provided a coupling ring 60 which is freely rotatable with respect to a rotor 317 but of which axial movement is limited. On the external periphery of coupling ring 60 there are provided grooves 60b for engaging with coupling projections 304e of a rotatable tube 304. At the right side of the coupling ring 60, a clutch member 61 is slidably fitted on the external periphery of the rotor 317, and a compression coil spring 62 is provided between the right end face of the rotor 317 and the clutch member 61. The clutch member 61 is provided with a linear guide groove 61c, in which engages a pin 63 provided on the rotor 317. The clutch member 61 can axially slide with respect to the rotor 317, while integrally rotating therewith. Consequently the clutch member 61 is biased to the left, in FIG. 5, by the compression coil spring 62 until limited by the pin 63 and the right hand end of the linear groove 61c. On the left end face of the clutch member 61, there are provided plural projections 61a of the same width, at a constant pitch. On the external periphery of the coupling ring 60, there are formed, at a constant pitch, grooves 60a in a number the same as that of projections 61a or a multiple of the number of projections, and the width of grooves 60a is so selected that projections 61a can engage with grooves 60a.

In the embodiment shown in FIG. 5, the grooves 60b do not reach the right end of the coupling ring 60, and are so positioned as not to interfere with the grooves 60a in the circumferential direction. An intermediate tube 23, for mode switching as in the first embodiment, is provided therein with a projection 23a, for engaging with an annular projection 61b formed on the external periphery of the clutch member 61, and, in the PF or AF mode as shown in FIG. 5, there is maintained a certain gap between the projection 23a of the intermediate tube 23 and the annular projection 61b of the clutch member 61. Except for the clutch structure of which mode switching direction is inverse to that in the first embodiment, the present third embodiment is the same as the first embodiment, so that the members having the same functions as those in the first embodiment are represented by the same numbers and will not be explained further.

In the following there will be explained the coupling function for the rotor 317 and the rotatable tube 304 by the clutch of the third embodiment. In the AF or PF mode, the intermediate tube 23 moves toward the left in a similar manner, but in the opposite direction, as in the first embodiment shown in FIG. 1, whereby the clutch member 61, which, in the M mode, is prevented from leftward movement by the intermediate tube 23 and is disconnected from the coupling ring 60, moves to left together with the intermediate tube 23 by the biasing force of the compression coil spring 62. The coupling and disconnection of the intermediate ring 26 and the rotatable tube 304 in this operation are identical with those in the first embodiment except that the moving direction for switching is inverted. The clutch member 61 moves linearly to the left with respect to the rotor 317 until the pin 63 reaches an end of the linear guide groove 61c, whereby the projections 61a of the clutch member 61 are pressed to the coupling ring 60. Thus, when the clutch member 61 rotates together with the rotor 317 in response to a mode switching signal, the projections 61a engage with the grooves 60a of the coupling ring 60, whereby the rotation of the ultrasonic wave motor is transmitted to the rotatable tube 304 through the clutch member 61 and the coupling ring 60.

In the foregoing first and second embodiments, the pressure between the rotor 17, 217 and the stator 18 is maintained constant in any of the PF, AF and M modes. On the other hand, in the present third embodiment, while the pressure is maintained constant in the PF and AF modes, the pressure varies in the M mode because the clutch member 61 is moved to the right by the intermediate tube 23 against the biasing force of the compression coil spring 62, thereby adding the biasing force to the pressure. However such change in pressure is never a problem, because the rotation of the rotor 317 is stopped in the M mode. In case the clutch is shifted from the M mode to the PF or AF mode, the biasing force of the compression coil spring 62 toward the right vanishes when the front ends of the projections 61a reach the right lateral face of the coupling ring 60, so that the rotation of the rotor 317 is never impeded. Therefore, upon rotation of the rotor 317, the projections 61a enter the grooves 60a by the biasing force of the compression coil spring 62 toward the right, thereby securely engaging with grooves 60a. It is to be noted that, in the foregoing first and second embodiments, the rotor 17 or 217 is already in rotation at the shifting of the clutch between the connected and disconnected state, but, in the third embodiment, the rotor 317 is rendered rotatable only when clutch shifting is completed.

As explained in the foregoing, according to the present invention, there is provided, in the fixed lens barrel, a coupling ring rotatable about the optical axis but not movable in the axial direction between the rotor of the ultrasonic wave motor and the clutch member, or the clutch coupling between the rotor and a rotatable tube is conducted in the radial direction, whereby the pressure of the clutch member is not applied to the rotor at the clutching operation from a manual focusing mode to an automatic focusing or a powered focusing mode in which the focusing lens is driven by the ultrasonic wave motor. Consequently the pressure between the rotor and the stator of the ultrasonic wave motor is maintained constant at the clutch operation. Thus, there can be avoided the unexpected stopping of the ultrasonic wave motor, resulting from an irregular pressure between the rotor and the stator at the switching of the clutch between the connected and disconnected states. Consequently there is obtained a lens barrel allowing smooth switching from the manual mode to the automatic focusing or powered focusing mode.

Though the present invention has been explained by certain embodiments thereof shown in the attached drawings, the present invention is by no means limited to such embodiments and is subject to variations and modifications within the scope and spirit of the appended claims.

What is claimed is:

1. A lens barrel having a focusing lens system, comprising:

a moving member rotatable about an optical axis of said focusing lens system, for moving said focusing lens system along the optical axis for focusing;

manual operation means for rotating said moving member;

an ultrasonic wave motor including a stator provided with an elastic member for causing a vibration by an AC voltage, and a rotor capable of rotation about said optical axis according to the vibration of said stator;

mode switching means for selecting either a first focusing mode in which said focusing is conducted by moving said moving member with said ultrasonic wave motor, or a second focusing mode in which said focusing is conducted by rotating said moving member by said manual operation means;

pressuring means for applying a substantially constant pressure between said stator and said rotor; and clutch means engaged for transmitting the rotation of said rotor to said moving member without increasing said pressure between said stator and said rotor, in response to the selection of said first focusing mode by said mode switching means, and disengaged in response to the selection of said second focusing mode;

wherein said clutch means comprises:
a coupling member prevented from axial movement but rotatable about the optical axis in linkage with the rotation of said rotor;

a clutch member adapted for moving along said optical axis in response to the selecting by said mode switching means, thereby connecting or disconnecting said moving member and said coupling member; and wherein each of said rotor and said clutch member is provided with a plurality of projections for coupling with said coupling member, and said coupling member is provided with grooves which are capable of engaging with said projections of said rotor and grooves which are capable of engaging with said projections of said clutch member, said projections and grooves being arranged so that said projections of said rotor and those of said clutch member do not interfere with each other.

2. A lens barrel having a focusing lens system, comprising:

a moving member rotatable about an optical axis of said focusing lens system, for moving said focusing lens system along the optical axis for focusing;

manual operation means for rotating said moving member;

an ultrasonic wave motor including a stator provided with an elastic member for causing a vibration by an AC voltage, and a rotor capable of rotation about said optical axis according to the vibration of said stator;

mode switching means for selecting either a first focusing mode in which said focusing is conducted by moving said moving member with said ultrasonic wave motor, or a second focusing mode in which said focusing is conducted by rotating said moving member by said manual operation means;

pressuring means for applying a substantially constant pressure between said stator and said rotor; and clutch means engaged for transmitting the rotation of said rotor to said moving member without increasing said pressure between said stator and said rotor, in response to the selection of said first focusing mode by said mode switching means, and disengaged in response to the selection of said second focusing mode;

wherein said clutch means comprises a clutch member capable, in response to the selecting by said mode switching means, of radial displacement with respect to the optical axis for coupling with said rotor, and of integrally rotating with said moving member, whereby said moving member is rotated integrally with said rotor when said clutch member is coupled with said rotor.

3. A lens barrel having a focusing lens system, comprising:

a moving member rotatable about an optical axis of said focusing lens system, for moving said focusing lens system along the optical axis for focusing;

manual operation means for rotating said moving member;

an ultrasonic wave motor including a stator provided with an elastic member for causing a vibration by an AC voltage, and a rotor capable of rotation about said optical axis according to the vibration of said stator;

mode switching means for selecting either a first focusing mode in which said focusing is conducted by moving said moving member with said ultrasonic wave motor, or a second focusing mode in which said focusing is conducted by rotating said moving member by said manual operation means;

pressuring means for applying a substantially constant pressure between said stator and said rotor; and clutch means engaged for transmitting the rotation of said rotor to said moving member without increasing said pressure between said stator and said rotor, in response to the selection of said first focusing mode by said mode switching means, and disengaged in response to the selection of said second focusing mode;

wherein said clutch means comprises a key member rotatable integrally with said moving member and radially displaceable about the optical axis in response to the selecting by said mode switching means; and plural key grooves formed on said rotor, wherein said key member engages, when radially displaced, with one of said key grooves for rotating integrally said rotor and said moving member.

4. A lens barrel having a focusing lens system, comprising:

a moving member rotatable about an optical axis of said focusing lens system, for moving said focusing lens system along the optical axis for focusing;

manual operation means for rotating said moving member;

an ultrasonic wave motor including a stator provided with an elastic member for causing a vibration by an AC voltage, and a rotor capable of rotation about said optical axis according to the vibration of said stator;

mode switching means for selecting either a first focusing mode in which said focusing is conducted by moving said moving member with said ultrasonic wave motor, or a second focusing mode in which said focusing is conducted by rotating said moving member by said manual operation means;

pressuring means for applying a substantially constant pressure between said stator and said rotor; and clutch means engaged for transmitting the rotation of said rotor to said moving member without increasing said pressure between said stator and said rotor, in response to the selection of said first focusing mode by said mode switching means, and disengaged in response to the selection of said second focusing mode;

wherein said clutch means comprises a coupling member prevented from axial movement but rotatable about the optical axis together with said moving member; a clutch member rotatable integrally with said rotor and movable along said optical axis in response to the selecting by said mode switching means, thereby effecting connection to or disconnection from said coupling member; and a spring member provided between said rotor and said clutch member, for applying a biasing force for coupling said clutch member and said coupling member.

5. A lens barrel according to claim 4, wherein each of said moving member and said clutch member is provided with a plurality of projections for coupling with said coupling member, and said coupling member is provided with grooves which are capable of engaging with said projections of said moving member and grooves which are capable of engaging with said projections of said clutch member, said projections and grooves being arranged so that said projections of said moving member and those of said clutch member do not interfere with each other.

6. A lens barrel according to claim 4, wherein said coupling member and said clutch member are fitted on the external periphery of said rotor, and said spring member includes a coil spring wound on the external periphery of said rotor.

* * * * *